United States Patent
Yamato et al.

(10) Patent No.: US 11,392,693 B2
(45) Date of Patent: Jul. 19, 2022

(54) VALIDITY CONFIRMATION EQUIPMENT

(71) Applicant: FANUC CORPORATION, Yamanashi (JP)

(72) Inventors: Kazuhiro Yamato, Yamanashi (JP); Hiroji Nishi, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 205 days.

(21) Appl. No.: 15/930,855

(22) Filed: May 13, 2020

(65) Prior Publication Data

US 2020/0401693 A1 Dec. 24, 2020

(30) Foreign Application Priority Data

Jun. 21, 2019 (JP) .............................. JP2019-115448

(51) Int. Cl.
| | |
|---|---|
| *G08B 23/00* | (2006.01) |
| *G06F 12/16* | (2006.01) |
| *G06F 12/14* | (2006.01) |
| *G06F 11/00* | (2006.01) |
| *G06F 21/56* | (2013.01) |
| *G06F 9/4401* | (2018.01) |

(52) U.S. Cl.
CPC ............ *G06F 21/56* (2013.01); *G06F 9/4406* (2013.01); *G06F 2221/033* (2013.01)

(58) Field of Classification Search
CPC ... G06F 21/56; G06F 9/4406; G06F 2221/033
USPC .......................................................... 726/22
See application file for complete search history.

(56) References Cited

U.S. PATENT DOCUMENTS

| | | | |
|---|---|---|---|
| 6,236,901 B1* | 5/2001 | Goss ................ | G05B 19/41865 700/83 |
| 2010/0125354 A1* | 5/2010 | Knipfer .................. | G06Q 10/06 700/95 |
| 2010/0323668 A1* | 12/2010 | Matsui .............. | H04M 1/72406 455/412.2 |

(Continued)

FOREIGN PATENT DOCUMENTS

JP          2011-108167          6/2011

OTHER PUBLICATIONS

Pouyan Pourbeik; Semiautomated Model Validation of Power Plant Equipment Using Online Measurements; IEEE:2013; pp. 308-316.*

*Primary Examiner* — Monjur Rahim
(74) *Attorney, Agent, or Firm* — Wenderoth, Lind & Ponack, L.L.P.

(57) ABSTRACT

To confirm whether a computer in a kitted state kitted by kitting equipment is valid. Validity confirmation equipment (30) confirms whether a computer (10) in a kitted state kitted by kitting equipment (20) is valid. The validity confirmation equipment (30) includes a storage unit (32) that stores validity confirmation data set in advance in association with the kitting equipment (20), and a validity confirmation program used for confirming the validity of kitting work on the basis of the validity confirmation data. The validity confirmation equipment (30) starts the computer (10) using the validity confirmation program when the validity confirmation equipment (30) is connected to the computer (10) and then the computer is powered on, thereby causing the computer (10) to judge whether the kitted state is valid on the basis of the validity confirmation data.

6 Claims, 5 Drawing Sheets

1:VALIDITY CONFIRMATION SYSTEM

(56) References Cited

U.S. PATENT DOCUMENTS

| | | | |
|---|---|---|---|
| 2016/0048709 A1* | 2/2016 | Butler | H04L 67/1097 340/10.51 |
| 2016/0062706 A1* | 3/2016 | Kawamori | G06K 15/1805 358/1.13 |
| 2017/0054594 A1* | 2/2017 | Decenzo | H04L 67/12 |

* cited by examiner

1:VALIDITY CONFIRMATION SYSTEM

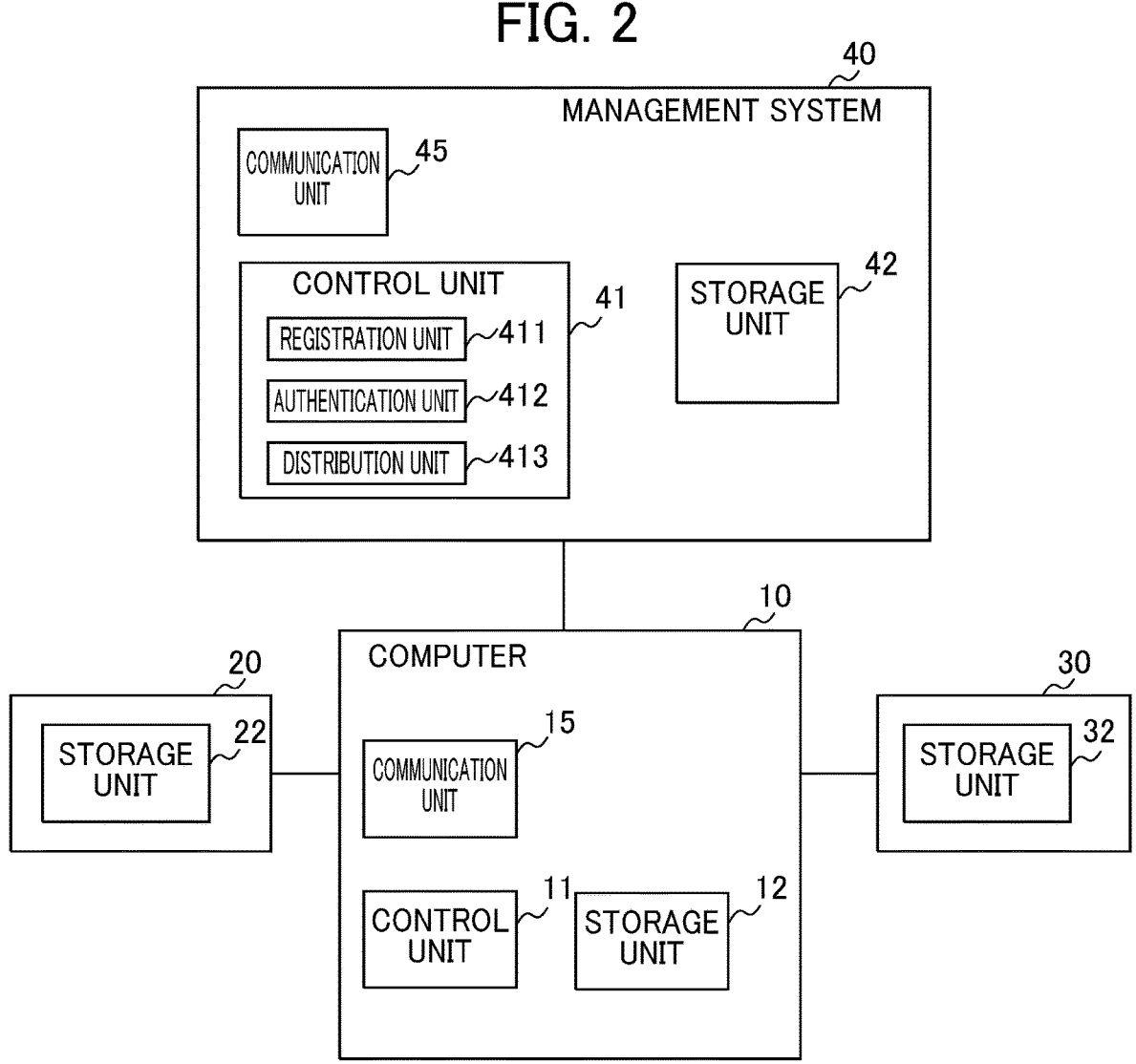

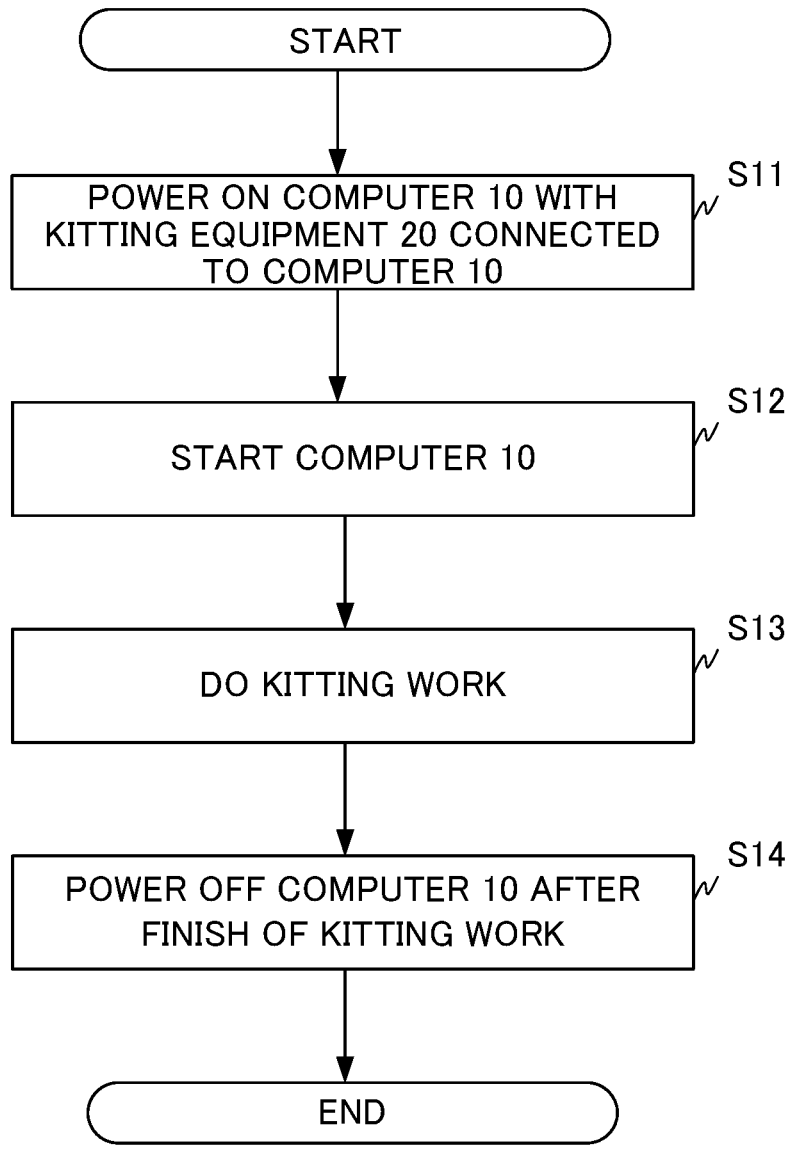

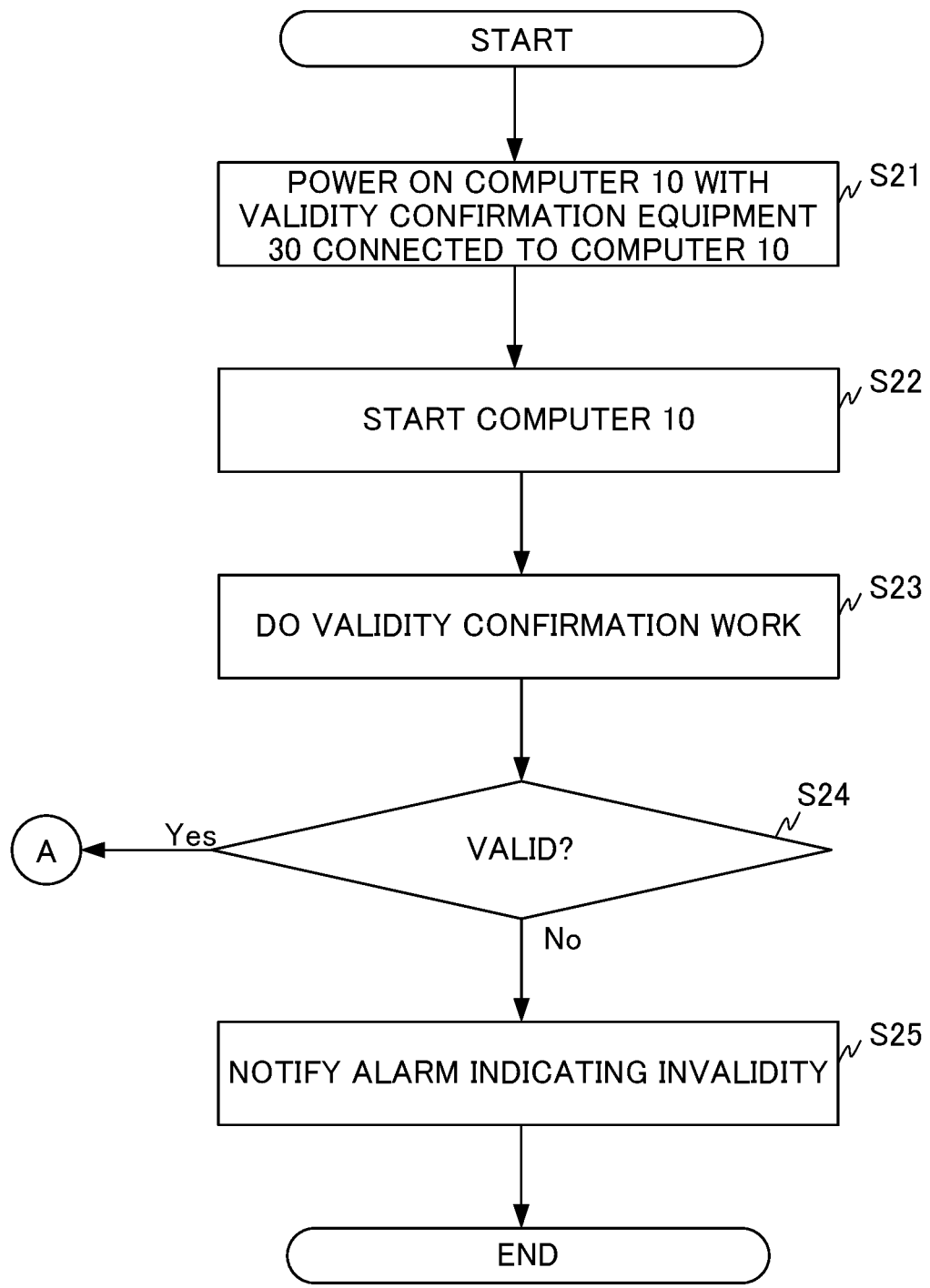

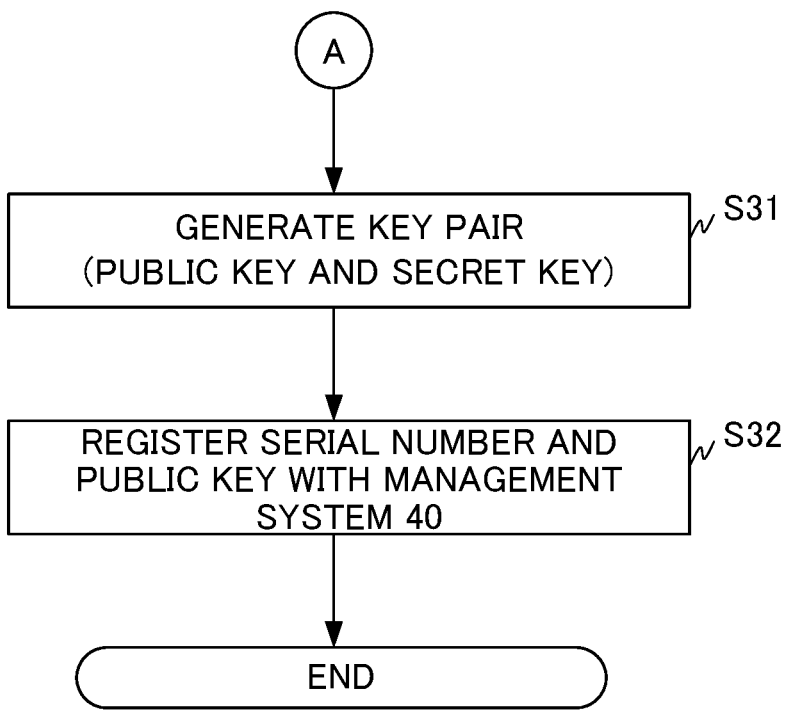

VALIDITY CONFIRMATION EQUIPMENT

This application is based on and claims the benefit of priority from Japanese Patent Application No. 2019-115448, filed on 21 Jun. 2019, the content of which is incorporated herein by reference.

BACKGROUND OF THE INVENTION

Field of the Invention

The present invention relates to a validity confirmation equipment that confirms the validity of software.

Related Art

In using computers, taking cyber security measures has become extremely important. As an example, accessing a malicious site via the Internet or using a contaminated USB memory causes the risk of unintentionally letting malware intrude into a computer. The intrusion of malware results in leak of secret data, seizing control of a computer, or malfunction of a computer, and these have become social issues. Malware has conventionally been handled by taking measures such as detection and deletion of the malware using a black list or prohibition of execution of the malware using a white list. By contrast, particular measures against malware have not been taken during kitting work at the time of introduction of a computer.

For introduction of a computer for personal use, a user of the computer himself or herself purchases the computer, installs an OS, middleware, application software, etc., and makes setting to make the computer available for use. These are frequently done and called kitting work. In some cases, even in the case of a computer for personal use, the computer is pre-kitted out with necessary software in advance before purchase in order to allow a user to use the computer immediately after the purchase. In such cases, the computer is often pre-kitted by a manufacturer providing the computer. By contrast, in the case of business use of a computer or introduction of a computer system with a large number of computers, kitting work is often done by a kitting service provider or a worker with a professional knowledge such as a system integrator.

If a user to use a computer is not to kit the computer by himself or herself, a malicious worker has a chance of setting malware at the computer at the time of kitting. If the worker is not a malicious worker, equipment used by the worker may be infected by malware. In this case, the malware may indirectly be set at the kitting target computer. For this reason, even if the computer is provided with anti-malware software using a black list or a white list, the anti-malware software itself may be replaced with malware and loses its effect as cyber security measures.

According to a mode of business started recently in the field of manufacturing devices, an edge server is installed on a manufacturing site. After kitting work on the edge server is finished, server application software (herein also called "application" or "app" simply) having various functions or purposes is downloaded only from a specific secure download site, and the downloaded app is used at the edge server. The edge server mentioned herein is a server communicably connected to manufacturing devices installed on a manufacturing site such as a factory including CNC machine tools, industrial machines, industrial robots, etc., and various types of edge units that are pieces of equipment accompanying the manufacturing devices such as image sensors, programmable logic controllers (PLCs), etc. Thus, the edge server fulfills a function relating to an edge unit and/or accesses processing data about the edge unit, for example, thereby performing predetermined information processing relating to the foregoing application. The processing data about the edge unit means data indicating an operating state, data indicating a production status, data indicating the quality of a product, and data indicating a working situation about the edge unit, for example.

Regarding operation of an edge server in the field of manufacturing devices, if kitting is done normally during kitting work at the time of purchase of the edge server, the edge server is operated in such a manner that every application to be run thereafter at the edge server is installed only from a specific secure download site. By doing so, the risk of setting malware after the kitting work is eliminated. It is, however, assumed that malware is set by a malicious worker during the kitting work at the time of purchase of the edge server. In this case, even if an installation source of an application is limited to a specific secure download site and the application is installed only from this site, it still becomes highly likely that leak of secret data, seizing control of a computer, or malfunction of a computer, etc. will occur. Additionally, if the edge server is operated in the presence of malware intruding therein, even the specific secure download site is still exposed to the risk of invalid processing. This causes the risk of big damage on another edge server connected to this download site.

In this regard, according to a technique disclosed in patent document 1, for example, the validity of each of a main program, an updating program, and a program for external communication is examined at the time of start of a client device (ECU, for example). Then, if these programs are confirmed to be valid, the client device (ECU, for example) is started. However, patent document 1 has no disclosure about measures to be taken if malware is set at basic software such as an OS or middle software during kitting work on the client device by a malicious worker. The technique disclosed in patent document 1 is considered to be employed on the assumption that kitting work has been done normally. If malware is set at the client device by a malicious kitting worker, for example, this technique does not provide a way for a user of the client device to confirm the validity of software installed on the client device by the kitting work.
Patent Document 1: Japanese Unexamined Patent Application, Publication No. 2011-108167

SUMMARY OF THE INVENTION

As described above, what is desired is that, if an outside worker does kitting work at the time of introduction of a computer for making the computer available for use, the validity of software installed on the computer by the kitting work be confirmed easily by a user of the computer.

(1) One aspect of this disclosure relates to validity confirmation equipment that confirms whether a computer in a kitted state kitted by a preset kitting material is valid. The validity confirmation equipment includes a storage unit that stores validity confirmation data set in advance in association with the kitting material, and a validity confirmation program used for confirming the validity of kitting work on the basis of the validity confirmation data. The validity confirmation equipment starts the computer using the validity confirmation program stored in the storage unit when the validity confirmation equipment is connected to the computer and then the computer is powered on, thereby causing the computer to judge whether the kitted state is valid on the basis of the validity confirmation data, and register the computer for use with a management system that manages the computer if the validity is confirmed.

According to the one aspect, if an outside worker does kitting work at the time of introduction of a computer for making the computer available for use, the validity of software installed on the computer by the kitting work can be confirmed easily by a user of the computer.

BRIEF DESCRIPTION OF THE DRAWINGS

FIG. 2 is a functional block diagram of the validity management system according to the embodiment;

FIG. 3A is a flowchart showing processing relating to kitting work on a computer by kitting equipment according to the embodiment;

FIG. 3B is a flowchart showing processing relating to work of confirming the validity of the computer by validity confirmation equipment according to the embodiment; and FIG. 3C is a flowchart showing processing relating to registration of the computer confirmed to be valid with a management system according to the embodiment.

DETAILED DESCRIPTION OF THE INVENTION

Embodiment

Figure 1:
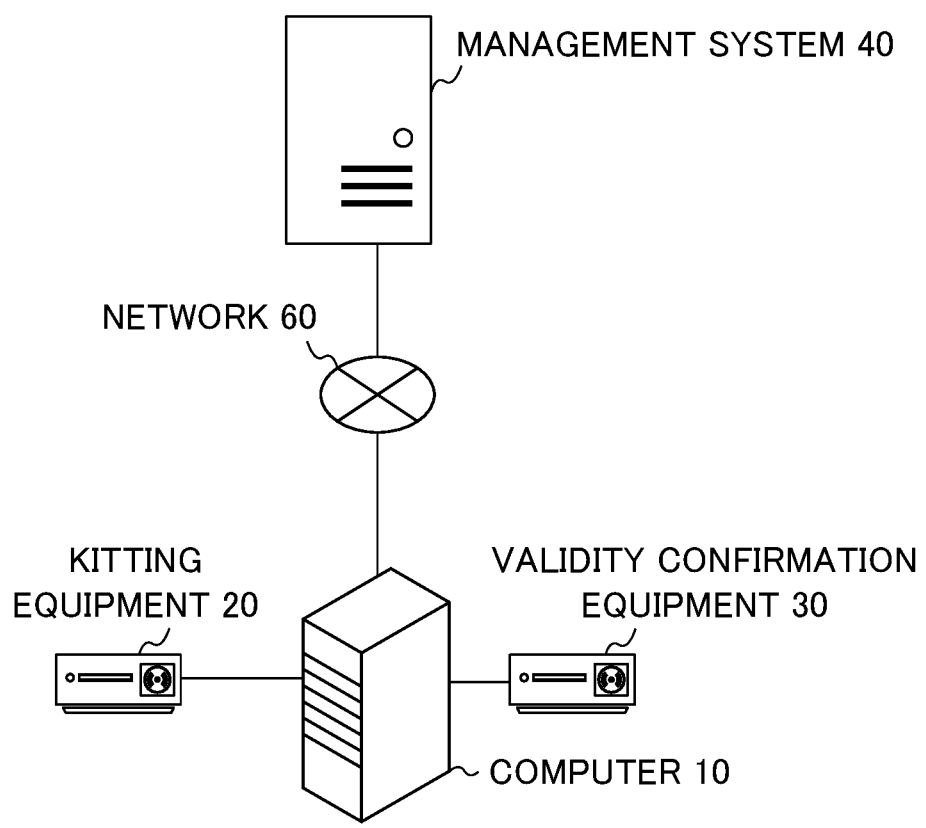
FIG. 1 is schematic view showing a basic configuration of a validity management system according to an embodiment.

An embodiment corresponding to an exemplary preferred embodiment of a validity confirmation system of the present invention will be described below by referring to the drawings. FIG. 1 shows an entire configuration of a validity confirmation system 1. In the embodiment, if the validity of software installed on the computer by the kitting work is confirmed, this computer is registered with a higher-order management system. Registering the computer with the management system allows the computer to acquire an application necessary for business from the management system, as described above. By contrast, if the validity of the software installed on the computer by the kitting work is not confirmed (if unidentified software is installed on the computer, for example), registration of this computer with the management system is not allowed to prohibit introduction of an application necessary for business into the computer.

As shown in FIG. 1, the validity confirmation system 1 has a configuration including a computer 10 as a computer to be kitted, kitting equipment 20 (also called a "kitting device") as a kitting material, validity confirmation equipment 30 (also called a "validity confirmation device") as validity confirmation equipment, a management system 40 as a management system, and a network 60. While pieces of information transferred between these pieces of equipment and devices are illustrated in FIG. 1, these pieces of information are merely illustrated as examples. The computer 10 is a computer to be a subject of kitting work. The computer 10 is configured in such a manner that, if the validity of the computer 10 is not confirmed by the validity confirmation equipment 30 after the computer 10 is kitted, business using the computer 10 is prohibited. The kitting equipment 20 is equipment (device) used by a worker in doing kitting work on the computer 10. Namely, the computer 10 is kitted via the kitting equipment 20. In the embodiment, the kitting equipment 20 is prepared by a reliable side such as an operating administrator that operates the management system 40 or a computer manufacturer providing the computer 10, for example, and is provided to a kitting worker. The validity confirmation equipment 30 confirms the validity of software installed on the computer by the kitting work without starting an OS, for example, installed on the computer 10 kitted by the kitting equipment 20. If the validity of the computer 10 is confirmed, the computer 10 becomes capable of being registered with the management system 40. In the embodiment, like the kitting equipment 20, the validity confirmation equipment 30 is prepared by a reliable side such as an operating administrator that operates the management system 40 or a computer manufacturer providing the computer 10, for example, and is provided to a user of the computer 10. As described above, the management system 40 registers the computer 10 confirmed to be valid to allow provision of an application necessary for business only to the registered computer 10. The foregoing pieces of equipment and devices will be described in detail next.

<Computer 10>

An example of the computer 10 is an edge server introduced in a manufacturing site such as a factory. The computer 10 is not limited to an edge server. The computer 10 is applicable to any computer. FIG. 2 shows a functional block diagram of the validity confirmation system 1. The computer 10 includes a CPU, a memory, a hard drive, a communication machine, etc., for example. In a state before kitting, software such as an OS is not introduced into the computer 10. The CPU is also called a control unit 11. The memory, hard drive, etc. are also called a storage unit 12. The communication machine is also called a communication unit 15. The computer 10 has a system BIOS. The system BIOS is configured as follows. Regarding devices likely to contain start-up software usable for starting the computer 10, for example, the system BIOS checks the devices in a predetermined sequence (also called a "start-up sequence") to determine whether these devices contain the start-up software. By doing so, if there is a device containing the start-up software, the system BIOS starts the computer 10 using the start-up software stored in this device. The devices storing such start-up software may be a hard drive, a floppy disk, a CD or DVD optical drive, a USB storage device, or devices on a network, for example. The computer 10 checks these devices in order in the start-up sequence.

The start-up sequence at the time of powering on the computer 10 can be set in advance. For example, the start-up sequence during the power-on is set initially by a reliable side such as an operating administrator that operates the management system 40 or a supply source (manufacturer) of the computer 10. Thus, by connecting the kitting equipment 20 to the computer 10 and then powering on the computer 10 at the time of kitting work, for example, it becomes possible to start the computer 10 using start-up software stored in the kitting equipment 20. The start-up software includes a program for kitting and is used for kitting work. Likewise, by connecting the validity confirmation equipment 30 to the computer 10 and then powering on the computer 10 at the time of validity confirmation work, it becomes possible to start the computer 10 using start-up software stored in the validity confirmation equipment 30. The start-up software includes a program for validity confirmation and is used for validity confirmation. These will be described in detail later.

<Kitting Equipment 20>

As described above, the start-up sequence during kitting work is set in such a manner that the kitting equipment 20 comes first in the start-up sequence. More specifically, the system BIOS is configured in such a manner as to start the computer 10 using the start-up software stored in the kitting equipment 20 by checking a device forming the kitting equipment 20 first. As an example, a USB storage device is applicable to the kitting equipment 20. Alternatively, the kitting equipment 20 may be a CD or DVD optical drive with a preset CD or DVD containing the start-up software. Still alternatively, a second computer (confirmed to be a valid computer) may be used as the kitting equipment 20. In this case, the computer 10 may be started (by network booting) using the start-up software (OS image, for example) stored in the second computer.

As shown in FIG. 2, the kitting equipment 20 includes a storage unit 22. The storage unit 22 contains an installer necessary for kitting work by a worker. The storage unit 22 further contains a file group such as a program or a scrip, for example, as previously compiled software to be installed on the computer 10 (hereinafter also called a "program to be installed"). The program to be installed on the computer 10 is required to be given information such as a network address that may be an IP address, a proper name of the computer 10, a virtual network address to be used in the computer 10, a type of a cooperative cloud function, etc., for example. To achieve this, a parameter setting supporting program to provide an input interface for input of these pieces of information may be stored in the kitting equipment 20 (storage unit 22). The kitting worker can do kitting work by starting the computer 10 using the kitting equipment 20 provided by an operating administrator, for example.

More specifically, when the kitting equipment 20 is connected to the computer 10 and then the computer 10 is powered on, the computer 10 is started using the start-up software (including the installer) stored in the kitting equipment 20. After the computer 10 is started using the start-up software stored in the kitting equipment 20, the computer 10 operates in such a manner as to copy a program to be installed on the computer 10 to a storage device (storage unit 12) as a program storage unit in the computer 10. As described above, the parameter setting supporting program may be started for inputting information to the program to be installed on the computer 10 such as a network address that may be an IP address, a proper name of the computer 10, a virtual network address to be used in the computer 10, a type of a cooperative cloud function, etc., for example. These pieces of information depend on an environment in which the computer 10 is placed, so that they are preferably input by a user of the computer 10.

<Validity Confirmation Equipment 30>

As described above, the start-up sequence during validity confirmation work is set in such a manner that the validity confirmation equipment 30 comes first in the start-up sequence. More specifically, the system BIOS is configured in such a manner as to start the computer 10 using the start-up software stored in the validity confirmation equipment 30 by checking a device forming the validity confirmation equipment 30 first. As an example, a USB storage device is applicable to the validity confirmation equipment 30. Alternatively, the validity confirmation equipment 30 may be a CD or DVD optical drive with a preset CD or DVD containing the start-up software. Still alternatively, a second computer (not shown) (confirmed to be a valid computer) may be used as the validity confirmation equipment 30. In this case, the computer 10 may be started (by network booting) using the start-up software (OS image, for example) stored in the second computer. As described above, like the kitting equipment 20, the validity confirmation equipment 30 is prepared by a reliable side such as an operating administrator that operates the management system 40 or a computer manufacturer providing the computer 10, for example, in response to the kitting equipment 20 used during kitting of the computer 10. Then, the validity confirmation equipment 30 is provided to a user of the computer 10.

As shown in FIG. 2, the validity confirmation equipment 30 includes a storage unit 32 that contains a program necessary for validity confirmation work (also called a "validity confirmation program") by a user of the computer 10 and data necessary for validity confirmation (also called "validity confirmation data"). More specifically, the storage unit 32 contains a program necessary for validity confirmation work (validity confirmation program) by the user of the computer 10. The storage unit 32 may further contain validity confirmation data including at least list data about program files to be stored at the time of kitting of the computer 10 (also called a "valid program file list") and a hash value about each program file (also called a "hash value about a valid program file"). The hash value about a valid program file is calculated using a preset hash function, for example. An arbitrary hash function such as MD5, SHA256, or HMAC, for example, is applicable to the hash function. By doing so, the user of the computer 10 is allowed to do the validity confirmation work via the validity confirmation equipment 30 provided from an operating administrator, for example.

When the validity confirmation equipment 30 is connected to the computer 10 and then the computer 10 is powered on, the computer 10 is started using the start-up software stored in the validity confirmation equipment 30. By doing so, the control unit 11 of the computer 10 becomes capable of functioning as a validity confirmation control unit without starting the computer 10 using an OS, for example, installed on the computer 10.

The control unit 11 as the validity confirmation control unit (hereinafter called a "validity confirmation control unit 11") scans the storage unit 12 of the computer 10 to generate a list of program files actually installed on the computer 10 by a worker (also called an "installed program file list"). Further, the validity confirmation control unit 11 calculates a hash value about each program file installed on the computer 10 (also called a "hash value about an installed program file") using the foregoing hash function.

Next, the validity confirmation control unit 11 compares the valid program file list and the installed program file list to judge whether there is a match between the lists. If there is no match between the valid program file list and the installed program file list, the validity confirmation control unit 11 judges that the computer 10 is not valid and may output an alarm, for example. If there is a match between the valid program file list and the installed program file list, the validity confirmation control unit 11 compares a hash value about a valid program file and a hash value about an installed program file on the basis of each program file, and judges whether there is a match between these hash values. If there is even one program file not matching in a hash value, the validity confirmation control unit 11 judges that the computer 10 is not valid and may output an alarm, for example.

The validity confirmation control unit 11 may provide an output interface in order to allow a user of the computer 10 to check information such as a network address that may be an IP address, a proper name of the computer 10, a virtual network address to be used in the computer 10, a type of a cooperative cloud function, etc., for example. The validity confirmation control unit 11 may provide an input interface in order to allow the user of the computer 10 to correct an error, if any.

After the validity confirmation control unit 11 confirms the validity of software installed on the computer 10 by the kitting work, the validity confirmation control unit 11 may register the computer 10 with the management system 40. The computer 10 is physically connected to the management system 40 via a network at the time of placement of the computer 10. More specifically, the validity confirmation control unit 11 may generate a key pair (a public key and a secret key), for example, and register a serial number specific to the computer 10 and the public key with the management system 40. After the computer 10 is registered with the management system 40, the management system 40 receives the serial number encrypted using the secret key from the computer 10 to confirm the authenticity of the computer 10. Thus, access from the computer 10 is allowed to allow distribution of an application to the computer 10, for example. If the validity of the computer 10 is not confirmed, the computer 10 is prohibited from being registered with the management system 40. Hence, in this case, introduction of an application necessary for business is prohibited, as described above. The validity confirmation equipment 30 is has been described above.

<Management System 40>

As shown in FIG. 2, the management system 40 includes a control unit 41, a storage unit 42, and a communication unit 45. The management system 40 is a higher-order system of the computer 10 and is communicably connectable to the computer 10 via the communication unit 45. The management system 40 registers and manages the computer 10 having been confirmed to be valid by the validity confirmation equipment 30. In response to a request for an app from the registered computer 10, the management system 40 can distribute the application to this computer 10. More specifically, the control unit 41 includes a registration unit 411, an authentication unit 412, and a distribution unit 413. If the validity confirmation equipment 30 confirms that the kitted computer 10 is valid, the registration unit 411 receives a serial number specific to this computer 10 and a public key transmitted from this computer 10, and stores the received serial number and public key into the storage unit 42. When the authentication unit 412 receives the serial number specific to the registered computer 10 encrypted using a secret key from this computer 10 in the form of an identifying ID or a password for log-in, for example, the authentication unit 412 decrypts the serial number encrypted using the secret key on the basis of the public key stored into the storage unit 42 at the time of registration of this computer 10. If the decrypted number matches the serial number of the computer 10 stored into the storage unit 42 at the time of registration of this computer 10, the authentication unit 412 recognizes the authenticity of the computer 10 to allow access. In response to a request for an application, the distribution unit 413 distributes the requested application to the computer 10. The management system 40 may have a configuration with a plurality of management systems 40-$n$ ($n$ is an index). In this case, registration information about the computer 10 registered with the management systems 40-$n$ may be shared between a different management system 40-$m$. Namely, registering the computer 10 with any of the management systems 40-$n$ may make the computer 10 further accessible to the different management system 40-$m$ to allow distribution of an application from the different management system 40-$m$. The embodiment of the validity confirmation system has been described above on the basis of the configurations of the computer 10, the kitting equipment 20, the validity confirmation equipment 30, and the management system 40.

Operation According to Embodiment

What is described below by referring to FIGS. 3A to 3C is a flow of operation from kitting work on the computer 10 by the kitting equipment 20, subsequent work of conforming the validity of the computer 10 by the validity confirmation equipment 30, and subsequent registration of the computer 10 with the management system 40 after the validity of the computer 10 is confirmed. FIG. 3A is a flowchart showing processing relating to the kitting work on the computer 10 by the kitting equipment 20. FIG. 3B is a flowchart showing processing relating to the work of confirming the validity of the computer by the validity confirmation equipment 30. FIG. 3C is a flowchart showing processing relating to the registration of the computer 10 confirmed to be valid with the management system 40. The kitting equipment 20 and the validity confirmation equipment 30 are prepared in advance by an administrator of the management system 40, for example, and are provided to a kitting worker and a user of the computer 10 respectively.

Referring to FIG. 3A, in step S11, the kitting equipment 20 is connected to the computer 10 and then the computer 10 is powered on.

In step S12, the computer 10 is started using start-up software (including an installer) stored in the kitting equipment 20.

In step S13, kitting work is done on the computer 10 using the start-up software (including the installer) and a file group such as a program, for example, stored in the kitting equipment 20.

In step S14, after the kitting work using the start-up software (including the installer) is finished, the computer 10 is powered off.

Referring to FIG. 3B, in step S21, the validity confirmation equipment 30 is connected to the computer 10 and then the computer 10 is powered on.

In step S22, the computer 10 is started using start-up software (including a validity confirmation program) stored in the validity confirmation equipment 30.

In step S23, validity confirmation of the computer 10 is made using the start-up software (including the validity confirmation program) and by referring to validity confirmation data stored in the validity confirmation equipment 30.

In step S24, the validity of the kitting of the computer 10 is judged using the start-up software (including the validity confirmation program). If the kitting is judged to be valid (if Yes), the processing proceeds to step S31. If the kitting is judged not to be valid, the processing proceeds to step S25.

In step S25, the user is notified of the fact that the kitting of the computer 10 is not valid using the start-up software (including the validity confirmation program).

Referring to FIG. 3C, in step S31, a key pair (a public key and a secret key) is generated using the start-up software (including the validity confirmation program).

In step S32, a serial number specific to the computer 10 and a public key are registered with the management system 40 using the start-up software (including the validity confirmation program). When the computer 10 is started thereafter (using an OS installed on the computer by the kitting work) with the validity confirmation equipment 30 disconnected from the computer 10, by transmitting the serial number encrypted using the secret key to the management system 40, the authenticity of the computer 10 is recognized by the management system 40 to allow receipt of distribution of an application from the management system 40. The flow of operation from kitting work on the computer 10 by the kitting equipment 20, subsequent work of conforming the validity of the computer 10 by the validity confirmation equipment 30, and subsequent registration of the computer 10 with the management system 40 after the validity of the computer 10 is confirmed is has been described above.

While the foregoing embodiment is a preferred embodiment of the present invention, the scope of the present invention is not limited only to the foregoing embodiment but the present invention can be carried out in embodiments including various changes within a range not deviating from the substance of the present invention.

In the example of the foregoing embodiment, the management system 40 is described as a higher-order system of the computer 10. Alternatively, the management system 40 may be a virtual server in a cloud, for example.

Programs including the application used in the present invention can be stored using various types of non-transitory computer-readable media and can be supplied to a computer. The non-transitory computer-readable media include various types of tangible storage media. Examples of the non-transitory computer-readable media include a magnetic storage medium (a flexible disk, magnetic tape, or a hard disk drive, for example), a magneto-optical storage medium (a magneto-optical disk, for example), a CD read-only memory (CD-ROM), a CD-R, a CD-R/W, and a semiconductor memory (a mask ROM, a programmable ROM (PROM), an erasable PROM (EPROM), a flash ROM, or a random access memory (RAM), for example). The programs can also be supplied to the computer using various types of transitory computer-readable media. Examples of the transitory computer-readable media include electrical signals, optical signals, and electromagnetic waves. The transitory computer-readable media can be used for supplying the program to the computer via wired communication paths such as electric wires and optical fibers, or wireless communication paths.

Effects of Embodiment

The embodiments of this disclosure will be listed below.

(1) According to the embodiment, to confirm whether the computer 10 in a kitted state kitted by the preset kitting equipment 20 is valid, the validity confirmation equipment 30 includes the storage unit 32 that stores validity confirmation data (a file list, a hash value about a file, etc., for example) set in advance in association with the kitting equipment 20, and a validity confirmation program used for confirming the validity of kitting work on the basis of the validity confirmation data. The validity confirmation equipment 30 starts the computer 10 using the validity confirmation program stored in the storage unit 32 when the validity confirmation equipment 30 is connected to the computer 10 and then the computer 10 is powered on, thereby allowing the computer 10 to judge whether the kitted state is valid on the basis of the validity confirmation data, and register the computer 10 for use with the management system 40 that manages the computer 10 if the validity is confirmed. Thus, when a worker does kitting work of setting various parameters for making the computer 10 available for use at the time of introduction of the computer 10, a user of the computer 10 becomes capable of easily confirming that software installed on the computer 10 by the kitting work is valid. As described above, after a user finishes confirming the validity of a kitted computer, the computer is registered for use. Thus, even if a malicious worker sets malware at a computer during kitting, the computer is prohibited from being registered for use until the validity of the computer is confirmed. This substantially eliminates a way of making the computer 10 functional to suffer no damage from the malware.

(2) The validity confirmation equipment 30 described in (1) may cause the computer 10 to judge whether the kitted state is valid on the basis of the validity confirmation data by starting the computer 10 using the validity confirmation program, and if the kitted state is judged not to be valid, the validity confirmation equipment 30 may cause the computer 10 to output an alarm indicating the invalidity. By doing so, the user is allowed to easily confirm that the kitting work on the computer 10 is not valid before use of the computer 10.

(3) The management system 40 described in (1) or (2) may allow distribution of an application to the computer 10 after the computer 10 is registered for use. As a result, even if a malicious worker sets malware at the computer 10 during kitting, the computer 10 is prohibited from receiving distribution of an application until the validity of the computer 10 is confirmed. This substantially prohibits the operation of the computer 10.

(4) The validity confirmation equipment 30 described in any one of (1) to (3) may function as a start-up device of the computer 10. This allows implementation of validity confirmation without starting an OS installed on the computer by the kitting work.

(5) The validity confirmation equipment 30 described in any one of (1) to (3) may be a second computer 50 different from the computer 10, and the computer 10 may be started using an OS image of the second computer 50. This allows implementation of validity confirmation without starting an OS installed on the computer by the kitting work.

(6) The computer 10 described in any one of (1) to (5) may be an edge server connected to a manufacturing device including an industrial machine and equipment accompanying the manufacturing device, and the management system 40 may be a higher-order system that manages distribution of an application to be executed by the edge server. By doing so, if kitting work on the edge server is done by an outside worker, for example, the edge server is registered for use with the management system after the kitting work is finished and then the validity of the edge server is confirmed. Thus, even if a malicious worker sets malware at the edge server during the kitting, the edge server is substantially suspended from functioning until the validity of the edge server is confirmed to suffer no damage from the malware.

EXPLANATION OF REFERENCE NUMERALS

1 Validity confirmation system
10 Computer
11 Control unit, validity confirmation control unit
12 Storage unit
15 Communication unit
20 Kitting equipment
22 Storage unit
30 Validity confirmation equipment
32 Storage unit
40 Management system
41 Control unit
42 Storage unit
45 Communication unit

What is claimed is:

1. Validity confirmation equipment that confirms whether a computer in a kitted state kitted by a preset kitting material is valid, the validity confirmation equipment comprising:

a storage unit that stores validity confirmation data set in advance in association with the kitting material, and a validity confirmation program used for confirming the validity of kitting work on the basis of the validity confirmation data, wherein, in response to the validity confirmation equipment being connected to the computer and then the computer being powered on, the computer is started using start-up software stored in the storage unit of the validity confirmation equipment, so as to cause the computer to:

judge whether the kitted state is valid on a basis of the validity confirmation data, and register the computer for use with a management system that manages the computer in response to the kitted state being judged by the computer as being valid, and wherein the start-up software stored in the storage unit of the validity confirmation equipment includes the validity confirmation program.

2. The validity confirmation equipment according to claim 1, wherein the validity confirmation equipment causes the computer to judge whether the kitted state is valid on the basis of the validity confirmation data by starting the computer using the validity confirmation program, and in response to the kitted state being judged by the computer as not being valid, the validity confirmation equipment causes the computer to output an alarm indicating the invalidity.

3. The validity confirmation equipment according to claim 1, wherein the management system allows distribution of an application to the computer after the computer is registered for use with the management system.

4. The validity confirmation equipment according to claim 1, wherein the validity confirmation equipment functions as a start-up device of the computer.

5. The validity confirmation equipment according to claim 1, wherein the validity confirmation equipment is a second computer different from the computer, and the computer is started using an OS image of the second computer.

6. The validity confirmation equipment according to claim 1, wherein the computer is an edge server connected to a manufacturing device including an industrial machine and equipment accompanying the manufacturing device, and the management system is a higher-order system that manages distribution of an application to be executed by the edge server.

* * * * *